United States Patent
Carter et al.

(10) Patent No.: US 6,519,767 B1
(45) Date of Patent: *Feb. 11, 2003

(54) COMPILER AND METHOD FOR AUTOMATICALLY BUILDING VERSION COMPATIBLE OBJECT APPLICATIONS

(75) Inventors: Alan W. Carter, Bellevue, WA (US); Rajiv Kumar, Redmond, WA (US); Andrew R. Solomon, Redmond, WA (US)

(73) Assignee: Microsoft Corporation, Redmond, WA (US)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 1096 days.

(21) Appl. No.: 08/484,999

(22) Filed: Jun. 7, 1995

(51) Int. Cl.$^7$ .................................................. G06F 9/45
(52) U.S. Cl. ........................ 717/140; 717/122; 709/315
(58) Field of Search ................................. 395/700, 500, 395/682, 704, 712, 703, 683, 685, 705; 717/140, 136, 122, 120, 108, 106, 116; 709/315, 316

(56) References Cited

U.S. PATENT DOCUMENTS

| 4,558,413 A | * 12/1985 | Schmidt et al. ............. 364/300 |
| 4,809,170 A | * 2/1989 | Leblang et al. ............. 364/200 |
| 5,179,703 A | * 1/1993 | Evans .......................... 395/700 |
| 5,278,979 A | * 1/1994 | Foster et al. ................ 395/600 |
| 5,493,680 A | * 2/1996 | Danforth .................... 395/700 |
| 5,499,365 A | * 3/1996 | Anderson et al. ........... 395/600 |
| 5,579,509 A | * 11/1996 | Furtney et al. ............. 395/500 |
| 5,615,400 A | * 3/1997 | Cowsar et al. ............. 395/685 |
| 5,644,771 A | * 7/1997 | Endicott et al. ............ 395/712 |
| 5,649,200 A | * 7/1997 | Leblang et al. ............. 395/703 |
| 5,692,196 A | * 11/1997 | Unni et al. .................. 395/705 |
| 5,832,275 A | * 11/1998 | Olds ............................ 395/712 |

FOREIGN PATENT DOCUMENTS

EP   0282149   * 9/1988

OTHER PUBLICATIONS

"Management of Programming Compatibility within a Syetem of Separate Dependent Elements", IBM Technical Disclosure Bulletin, vol. 31, No. 8, Jan. 31, 1989.*
S. O'Malley, et al, "USC: A Universal Stub Compiler", sean@cs.arizona.edu, unknown.*
IBM, "OS/2 2.0 Technical Library, System Object Model Guide and Reference", Chapter 1, Chapter 6 (pp. 6–2 to 6–3), Dec. 1991.*
IBM, "OS/2 2.0 Application Design Guide, The Official Guide", pp. 7–4 to 7–12, Que, Mar. 1992.*
K. Brockschmidt, Inside OLE, 2nd ed. Microsoft Press, pp. 27–29; chapter 3, 1995.*
D. J. Kruglinski, Inside Visual C++, version 1.5, Microsoft Press, p. 592, 1994.*

* cited by examiner

Primary Examiner—Sue Lao
(74) Attorney, Agent, or Firm—Klarquist Sparkman, LLP

(57) ABSTRACT

A compiler automatically builds a new version of an object server to be compatible with an existing version so that client applications built against the existing version are operable with the new version. The existing version object server retains type information relating to its classes and members in a type library. The compiler performs version compatibility analysis by comparing the new version object server against the type information in the existing version's type library. If the compatibility analysis determines that the new and existing versions are compatible, the compiler builds the new version object server to support at least each interface supported by the existing version object server. The compiler further associates version numbers with the new version object server indicative of its degree of compatibility with the existing version object server.

25 Claims, 7 Drawing Sheets

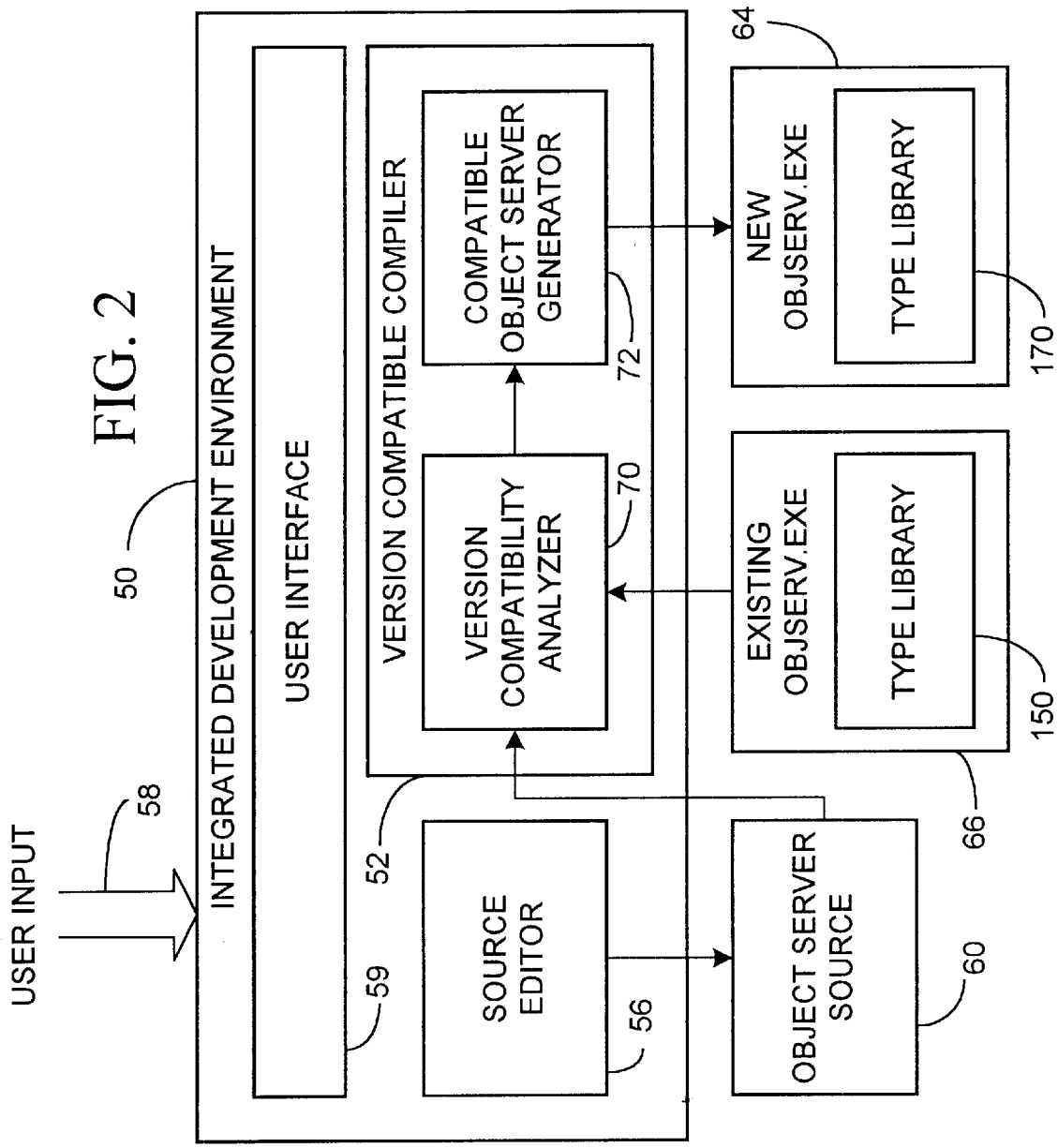

COMPILER AND METHOD FOR AUTOMATICALLY BUILDING VERSION COMPATIBLE OBJECT APPLICATIONS

FIELD OF THE INVENTION

This invention relates generally to compiling executable programs, and more particularly relates to compiling executable programs to be compatible with previous versions of such programs.

BACKGROUND OF THE INVENTION

A significant development in the computer programming field is that of object oriented programming. Object-oriented programming generally refers to computer programs, programming languages and tools which utilize the concept of "objects." The term "object" generally refers to an instance of a programmer-defined data structure (the data or variables of which are referred to as the object's "properties") and functions that manipulate that structure (referred to as "member functions," "member procedures," or simply "members" of the object). In other words, objects are a combination of a data structure with a set of functions that perform methods on the data structure. The term "class" generally refers to the definition of an object. Object concepts can be applied to programs formed with most any programming language, including C, Basic, and others. Various object-oriented programming languages, such as Microsoft Corporation's Visual Basic version 4 programming environment, and the C++, and Smalltalk programming languages, provide formal syntax by which object-oriented concepts may be more easily expressed.

One benefit to the use of objects is that their members define a standard way for other programs to interact with or access the object's properties. A set of semantically related functions implemented on an object is generally referred to as an "interface" of the object. Each object typically includes at least one interface, but in some object-oriented systems (such as OLE 2 described below) may include more than one interface. By allowing access to an object's members through an interface, the object effectively "exposes" its functionality for use by other application programs. For example, a simple object with a property, "Color," may have an interface which includes two members, "GetColor" and "SetColor," which manipulate that property. Other application programs which have access to this object's interface can make use of its functionality by calling the GetColor and SetColor members of that interface.

Microsoft Corporation's Object Linking and Embedding 2 ("OLE 2") provides a system for creating object-oriented applications for use with its Windows operating system. OLE 2 provides a way for objects supplied by one application program (hereafter referred to as the "object application" or "object server") to be controlled by another application program (hereafter referred to as a "controlling application" or "client application"). After an object server is created, its programmer or developer can distribute the object server in the form of an executable file for use by others. Other developers and end users can then create client applications which make use of the functionality embodied in the object server's objects by accessing those objects through their interfaces. Accordingly, OLE 2 provides a way for the functionality embodied in the object server to be useable by any number of client applications.

In order to access the interfaces of an object server, client applications are created by compiling the client applications using a specific version of the object server (i.e. "built against" an existing version of the object server which may have been distributed to the client application's developer by the object application's developer). When built against a specific object server, the client application will have embedded in it detailed assumptions about the set of interfaces that the object server supports, and the definition of those interfaces. For example, in OLE 2, interfaces to objects of an object server can be virtual function table interfaces or dispatch interfaces. An object implements a virtual function table interface by providing a virtual function table (vtable), which is an array containing pointers to members of the object such that the signatures of the members and their offsets within the vtable are exactly as specified in the definition of that interface. Members in the interface are accessed by client applications according to the particular offset of their function pointers within the vtable. More particularly, code is built into the client application which accesses a member by locating the function pointer at the member's respective offset within the vtable, and issuing a call instruction to that function pointer. The assumption that the pointer to a member can be found at a particular vtable offset in the interface is thus embedded in the client application.

An object implements a dispatch interface by providing a dispatching interface (IDispatch) implementation whose "invoke" function supports a dispatch identifier (DISPID) to member mapping as specified by the interface's definition. The IDispatch interface is implemented in conformance with the description in Corbett, et al., Method and System for Invoking Methods of an Object through a Dispatching Interface, U.S. Pat. No. 5,515,536 which is hereby incorporated by reference. Members in the interface are accessed by client applications according to their respective DISPIDs. More particularly, code is built into the client application which accesses a member by calling the invoke function and passing the member's DISPID as an argument. The assumption that the DISPID will be mapped to the desired member is thus embedded in the client application.

Additionally, before a client application can begin accessing members within an interface, it must first gain access to the interface itself by obtaining a pointer to the interface. In OLE 2, object servers may provide a type library conforming to the description in U.S. patent application Ser. No. 07/959,056, entitled "Method and System for Interfacing to a Type Library," which is hereby incorporated by reference. The type library contains definitions of the classes of objects supplied by the object server and their interfaces.

So that client applications can get a pointer to interfaces on the object server's objects, each object server registers information in a system registry provided in the operating system by which the classes that the object server supplies and their interfaces can be identified. This information includes a library identifier (library ID) associated with the object server's type library and a unique class identifier (CLSID) associated with each of the classes it supplies, and also may include a unique interface identifier (IID) associated with each interface of the classes. In Microsoft Corporation's Windows operating system, version 3.1, for example, object servers register their identifiers in a system registry that is maintained in a file named, "REG.DAT," generally located in a directory with default name, "\WINDOWS." In Microsoft Corporation's Windows NT operating system, object server identifiers are kept in a "HKEY_CLASSES_ROOT" section of a system registry maintained in the "\WINDOWS\SYSTEM32\CONFIG" directory.

OLE 2 further provides application programming interface (API) functions (e.g. CoCreateInstance and CoGetClassObject) which, given a CLSID, and IID passed in a call to the function, creates an object based on the definition of the class associated with the CLSID, and returns a pointer to the interface associated with the IID. Client applications obtain an initial pointer to an interface on an object with built-in code that calls such API functions with a CLSID to uniquely identify the object's class in the system registry, and an IID that identifies the class' interface. Accordingly, the assumption that the CLSID correctly identifies the class, and the IID correctly identifies the desired interface additionally is built into the client application.

Client applications also have embedded assumptions concerning the library ID associated with the object server's type library. A specific library ID is associated with the type libraries for versions of an object server that supports a same set of service, i.e. a same set of CLSIDs and IIDs. Conversely, versions of an object server that don't support an identical set of CLSIDs and IIDs have different library IDs assigned to their type libraries. By examining the library ID registered for a particular version of an object server (such as by calling a "RegQueryKey" API function), client applications therefore can verify whether the object server version supports a desired set of CLSIDs and IIDs.

Because of these detailed assumptions that are built into client applications, there arises (in effect) a contractual agreement between an object server and its client applications that the object server's interfaces have specific DISPIDS and vtable offsets for its members that will not change. Consequently, if any update or modification to an object server causes the DISPIDs or vtable offsets of its members to change, then the updated object server cannot support the same interfaces as its predecessor object server. When the updated object server fails to support one or more interfaces of the original version object server, the updated and original version object servers are said to lack version compatibility. Such version incompatibility means that client applications which were built against the original version object server (and therefore depend on the members having specific DISPIDs and vtable offsets in its interfaces) will be unable to access members of the updated object server and will cause errors in the attempt.

For example, when an object server named "MyServer" with a class named "MyObject" having a member "MyFunction" is built into an executable file (e.g. MyServer.exe), an interface is generated for MyObject in which MyFunction is assigned a unique vtable offset and DISPID. MyObject and its interface also are assigned a specific CLSID and IID, respectively. Any client applications built against MyServer are compiled into an executable program (e.g. MyApp.exe) which references MyFunction by the combination of MyObject's CLSID and IID, and MyFunction's DISPID. If MyServer is later modified and rebuilt so that MyFunction's DISPID changes (due to removing MyFunction from MyObject or changing the definition of MyFunction), these previously built client applications will cause an invoke error when trying to call MyFunction by its prior IID/DISPID combination. Rebuilding the client applications against the new version of MyServer will rebind their MyFunction references to its new IID/DISPID combination. However, copies of the client applications that already are distributed to end users and installed on their machines will not be operable with the new object server.

A further problem with prior compilers is that the CLSIDs, IIDs, and DISPIDs of objects in the object servers have to be set and managed manually, such as with #define statements in an included header file. This places additional burdens on the programmer to manually track any changes to an object server which require corresponding changes to the CLSIDs and IIDs assigned to its objects, and manually update these identifiers.

One objective of the present invention, therefore, is to provide a compiler capable of automatically building an updated versions of an object server to be compatible with a previous version thereof when any differences in their source code permit.

A further objective of the invention is to detect differences in the source code of a revised object server from an existing version thereof that prevents the compiler from building the revised object server to be version compatible with the existing version, and notifying the object server's developer that the revised object server cannot be compatible.

Another objective of the invention is to generate version numbers associated with each version of an object server which are indicative of the degree of compatibility between such versions of the object server.

Yet another objective of the invention is to automatically generate and control the library, class, interface, and dispatch identifiers of the object servers such that object server developers are not exposed to the identifiers of the object servers they create.

SUMMARY OF THE INVENTION

The present invention is a compiler and method for automatically compiling a program into a new object server so as to be version compatible with an existing object server. (A new versions of an object server is defined to be version compatible with its existing version when the new version's classes are version compatible with those of the existing version. A new version of a class is version compatible its existing version if the new version supports all the interfaces of the existing version.) The invention includes version compatibility analysis of the program to detect any version incompatible differences from an existing version of the object server. If no version incompatible differences exist, the program is compiled into a version compatible object server which supports at least the interfaces supported by the existing object server. (For example, purely additive modifications from the existing object server, such as the addition of members without altering existing members, generally would not prevent the new object server from supporting the existing object server's interfaces) Notification is provided if any difference is detected which prevents compiling a version compatible object server. Accordingly, a developer can upgrade an object server so as to fix bugs or incorporate additional functionality while retaining backward compatibility with client applications which were built against a previously distributed version of the object server. Although these client applications are unable to access the object server's added functionality, the object server's support for its previous version's interfaces enables the client applications to interoperate with the upgraded object server and make use of functionality carried over from the previous version.

According to one feature of an exemplary embodiment of the invention, version compatibility analysis is performed by comparing the program against type information which was generated during compiling the existing object server and retained in a type library. The type library forms part of the existing object server's executable program file (the existing object server's ".exe" file). Compiling a program to be version compatible with the existing object server is user-selectable, such as by setting a property of the new object server or a compiler option or parameter to specify the existing object server's executable file.

According to another feature of the exemplary embodiment, when compiling the program into a new object server that is version compatible to the existing object server, identifiers and vtable offsets for the new object server's classes are generated so as to be version compatible with those of the existing object server. In the type library of the new object server, each class for which there is a identically named class in the existing object server is assigned the same CLSID as was assigned to the identically named class in the existing object server. Further, the type library interface definitions for these classes that are identical to those of the identically named classes in the existing object server, with identical IIDs, as well as vtable offsets and DISPIDs. (CLSIDs, IIDs, DISPIDs, and vtable offsets are discussed in the Background of the Invention above.) Each of the CLSID, IIDs, vtable offsets, and DISPIDs are generated automatically for the new object server, without manual interaction, based on the type library of the existing object server. When the program is compiled into a new object server that is incompatible with the existing object server, new CLSIDs and IIDs are generated and assigned to the classes and interfaces of the new object server.

According to yet another feature of the exemplary embodiment, version numbers are associated with the type libraries of object servers and automatically updated to reflect an object server's version compatibility relative to other versions of the object server. This enables client applications to determine the functionality provided by a particular version object server by testing its library's version number. Each object server's type library stores type information generated in compiling the object server, and is assigned a library identifier and a version number consisting of a major and a minor version value. The type libraries of version compatible object servers are assigned identical library IDs. When a newly compiled object server supports only new interfaces due to one or more version incompatible differences from an existing object server, the type library of the new object server is assigned a new library ID and a new version number (e.g. "1.0") as if newly created. When the newly compiled object server supports each of the existing object server's interfaces and one or more new interfaces, the type library of the new object server is assigned a library ID identical to that of the existing object server's type library, and a version number whose minor version value is incremented in relation to that assigned to the existing object server's type library. When the newly compiled object server supports only the same set of interfaces as the existing object server, the type library of the new object server is assigned a library ID and a version number identical to those of the existing object server's type library.

Additional features and advantages of the invention will be made apparent from the following detailed description of a preferred embodiment which proceeds with reference to the accompanying drawings.

BRIEF DESCRIPTION OF THE DRAWINGS

FIG. 2 is a block diagram of a compiler in an integrated development environment within a computer system such as shown in FIG. 1 for automatically building version compatible object servers according to a preferred embodiment of the invention.

DETAILED DESCRIPTION OF THE PREFERRED EMBODIMENTS

Figure 1:
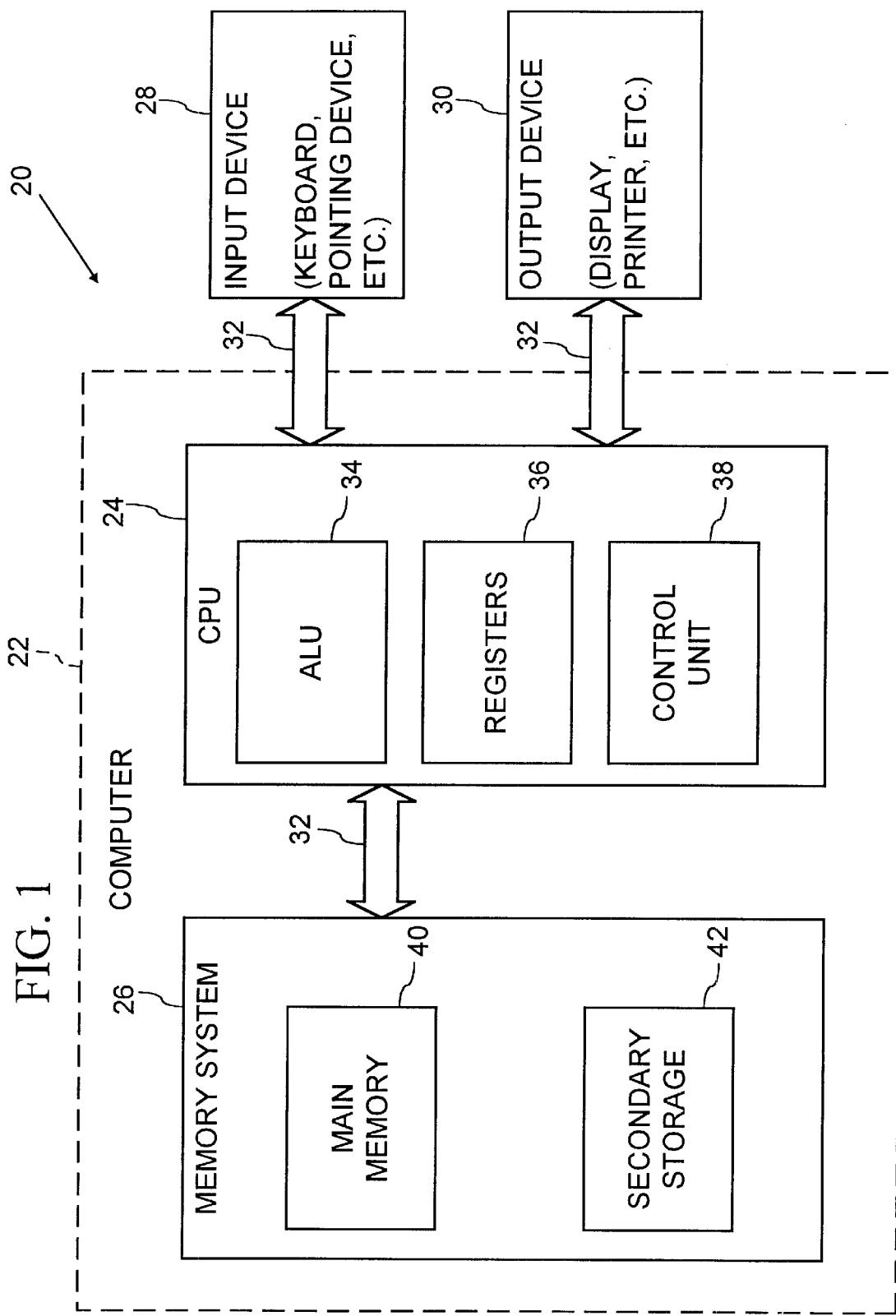
FIG. 1 is a block diagram of a computer system that may be used to implement a method and apparatus embodying the invention for transferring a data block from a source to a destination in memory.

Referring to FIG. 1, an operating environment for the preferred embodiment of the present invention is a computer system 20 that comprises at least one high speed processing unit (CPU) 28, in conjunction with a memory system 30, an input device 24, and an output device 26. These elements are interconnected by a bus structure 32.

The illustrated CPU 28 is of familiar design and includes an ALU 33 for performing computations, a collection of registers 34 for temporary storage of data and instructions, and a control unit 36 for controlling operation of the system 20. The preferred realization of CPU 28 is a Pentium processor manufactured by Intel, but a variety of other suitable processors, including those from Digital Equipment, Sun, MIPS, Motorola, etc., can alternatively be used.

The memory system 30 includes main memory 38 and secondary storage 40. Illustrated main memory 38 takes the form of 16 megabytes of semiconductor RAM memory. Secondary storage 40 takes the form of long term storage, such as ROM, optical or magnetic disks, flash memory, or tape. Those skilled in the art will recognize that memory 30 can comprise a variety of alternative components.

The input and output devices 24, 26 are also familiar. The input device 24 can comprise a keyboard, a mouse, a physical transducer (e.g. a microphone), etc. The output device 26 can comprise a display, a printer, a transducer (e.g. a speaker), etc. Some devices, such as a network interface or a modem, can be used as input and/or output devices.

As is familiar to those skilled in the art, the computer system 20 further includes an operating system and at least one application program. The operating system is the set of software which controls the computer system's operation and the allocation of resources. The application program is the set of software that performs a task desired by the user, making use of computer resources made available through the operating system. Both are resident in the illustrated memory system 30.

In accordance with the practices of persons skilled in the art of computer programming, the present invention is described below with reference to symbolic representations of operations that are performed by computer system 20, unless indicated otherwise. Such operations are sometimes referred to as being computer-executed. It will be appreciated that the operations which are symbolically represented include the manipulation by CPU 22 of electrical signals representing data bits and the maintenance of data bits at memory locations in memory system 30, as well as other processing of signals. The memory locations where data bits are maintained are physical locations that have particular electrical, magnetic, or optical properties corresponding to the data bits.

FIG. 2 is a block diagram of a programming language system or integrated development environment 50 which provides a compiler 52 for building version compatible object servers according to a preferred embodiment of the invention. The preferred embodiment of the invention utilizes Microsoft Corporation's Visual Basic for Applications language system, the compiler of which is adapted as described herein to automatically build version compatible object servers. In the preferred embodiment, integrated development environment 50 and its components are implemented as software modules running on computer system 20 (FIG. 1).

Integrated development environment 50 further includes a source editor 56 which provides conventional editing tools for a user to enter and modify programs, including programs which are to be compiled into object servers. Source editor 56 responds to user input 58 from input devices 24 (FIG. 1) to a user interface 59 of integrated development environment 50 and generates source data 60 which is stored in memory 30 (FIG. 1). In general, user input 58 takes the form of statements in the syntax of the programming language supported by integrated development environment 50, but also can include input from various menus, dialogs, and other controls provided in user interface 59. In the preferred embodiment, each program is entered by the user in the form of a "project" in the Visual Basic language system. In the Visual Basic language system, each project can include one or more class modules which each define an object. Source data 60 of the program can be stored by source editor 56 in the form of a data stream representation of the programming language statements, or more preferably a data stream consisting of a tokenized representation of the programming language statements.

Compiler 52 implements a process (described in further detail below) for automatically building a new object server 64 from source data 60 so as to be version compatible with an existing object server 66. In the preferred embodiment, compiler 52 conforms to the description in U.S. patent application Ser. No. 08/328,171, entitled "Module Dependency Based Incremental Compiler and Method," which is hereby incorporated by reference. As described in that application, source data 60 is compiled through a sequence of compilation states to an executable state. The principles of the invention also are applicable to other language systems and compilers. Accordingly, in alternative embodiments of the invention, the process of automatically building version compatible object servers can be implemented using language systems and compilers other than Microsoft Corporation's Visual Basic.

By setting controls in the user interface of integrated development environment 50 with user input 58, the user can select to compile and immediately run the object server once compiled to its executable state, or to compile and generate an executable file (e.g. a file with the ".exe" extension, such as "Objserv.exe") for the object server which can be saved in secondary storage 40 for later execution. When saved as an executable file, the object server can be distributed to others for use on their computer systems.

The user also can select with user input 58 to have compiler 52 compile source data 60 utilizing the process according to the present invention for automatically building a version compatible object server, or in the conventional manner (without the version compatible object server building process). To select automatic building of a version compatible object server, the user enters a name of existing object server's executable file 66 in a "Compatible Object Application" field of a "Project Options" dialog box available from a "Tools" menu provided by integrated development environment's user interface 59. If no file name is specified in the Compatible Object Application field (such as when compiling the first version of existing object server 66), compiler 52 compiles source data 60 conventionally into an object server without the automatic version compatible object server building process.

Figure 5:
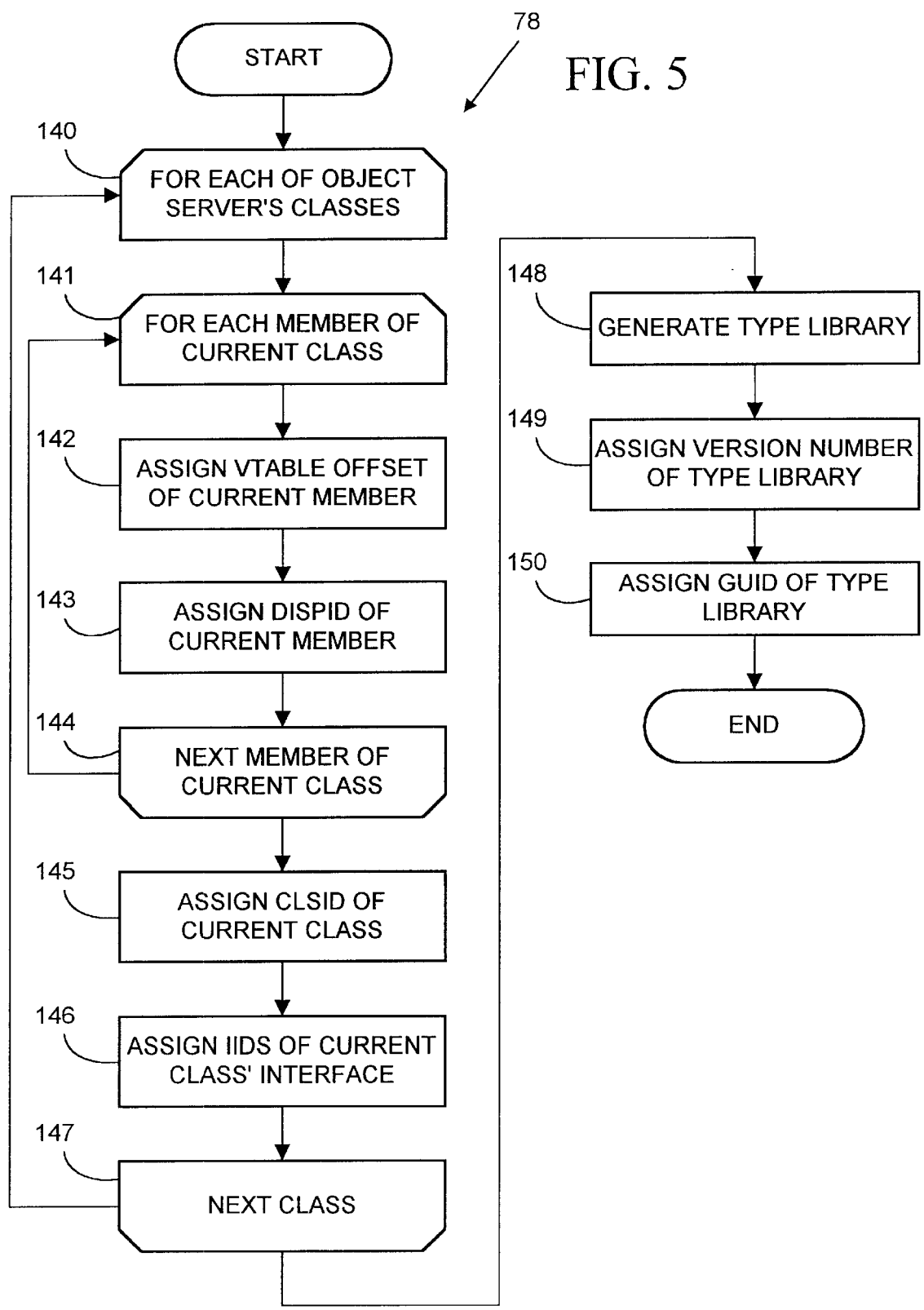
FIG. 5 is a flow diagram of a process utilized in the compiler of FIG. 2 to build an executable file of an object servers such as that shown in FIG. 4.

For use in the automatic version compatible object server building process, compiler 52 includes a version compatibility analyzer 70 and compatible object server generator 72. Version compatibility analyzer 70 utilizes a process 76 illustrated in FIG. 6 and described below to detect any modifications ("version incompatible differences") from existing object server 66 that prevent compiler 52 from building new object server 64 so as to be version compatible with existing object server 66. Compatible object server generator 72 builds new object server 64 from source data 60 including generating interface related information using a process 78 as illustrated in FIG. 5 and described below. When no version incompatible differences are detected by version compatibility analyzer 70, compatible object server generator 72 generates the interface related information in process 78 so as to be version compatible with existing object server 66.

Figure 3A:
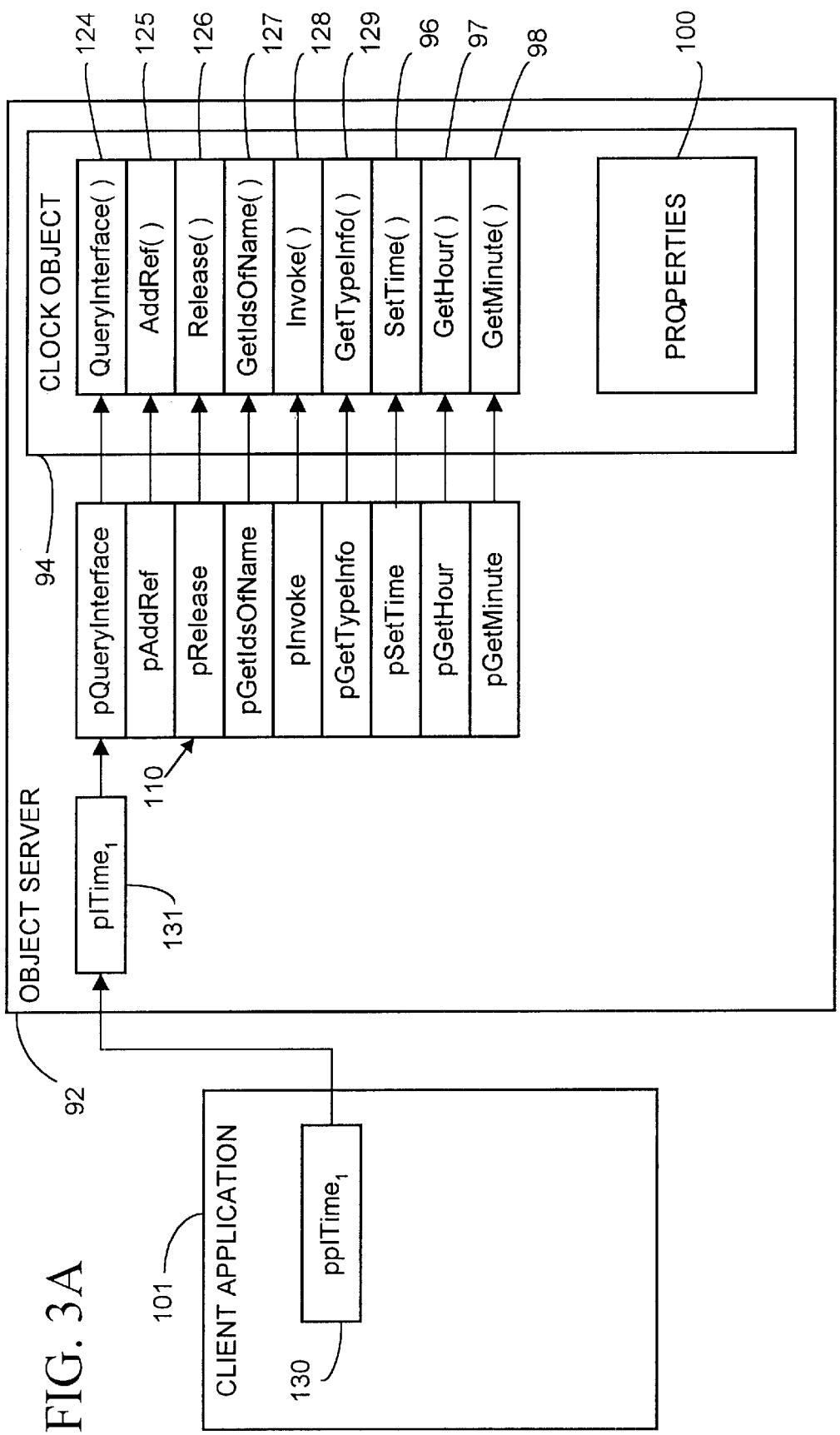
FIG. 3A is a block diagram of a previous version of an exemplary object server supporting an interface on an object accessible to a client application.
Figure 3B:
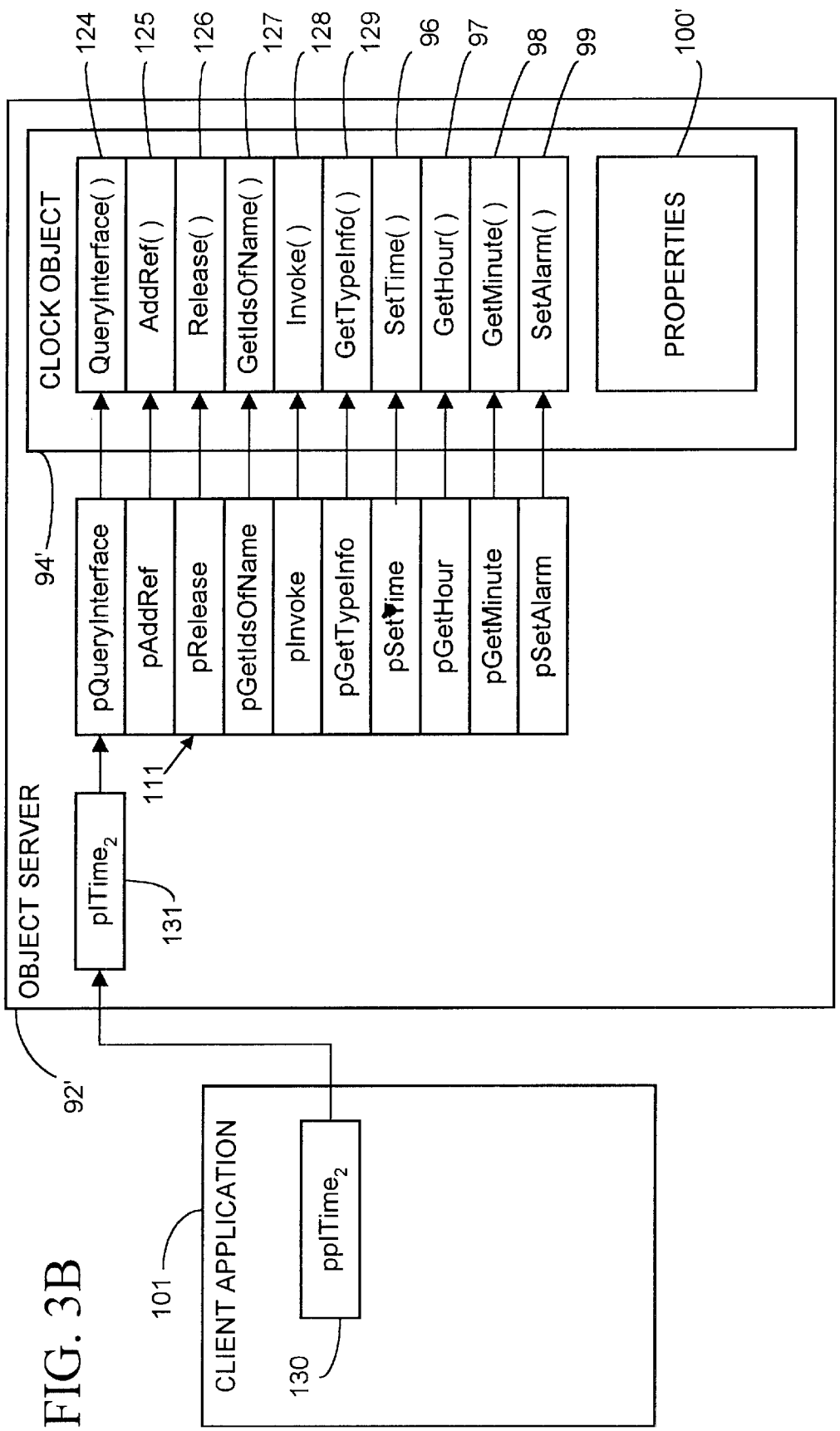
FIG. 3B is a block diagram of a modified version of the object server of FIG. 3A generated by the compiler of FIG. 2 to be compatible to the previous version.
Figure 4:
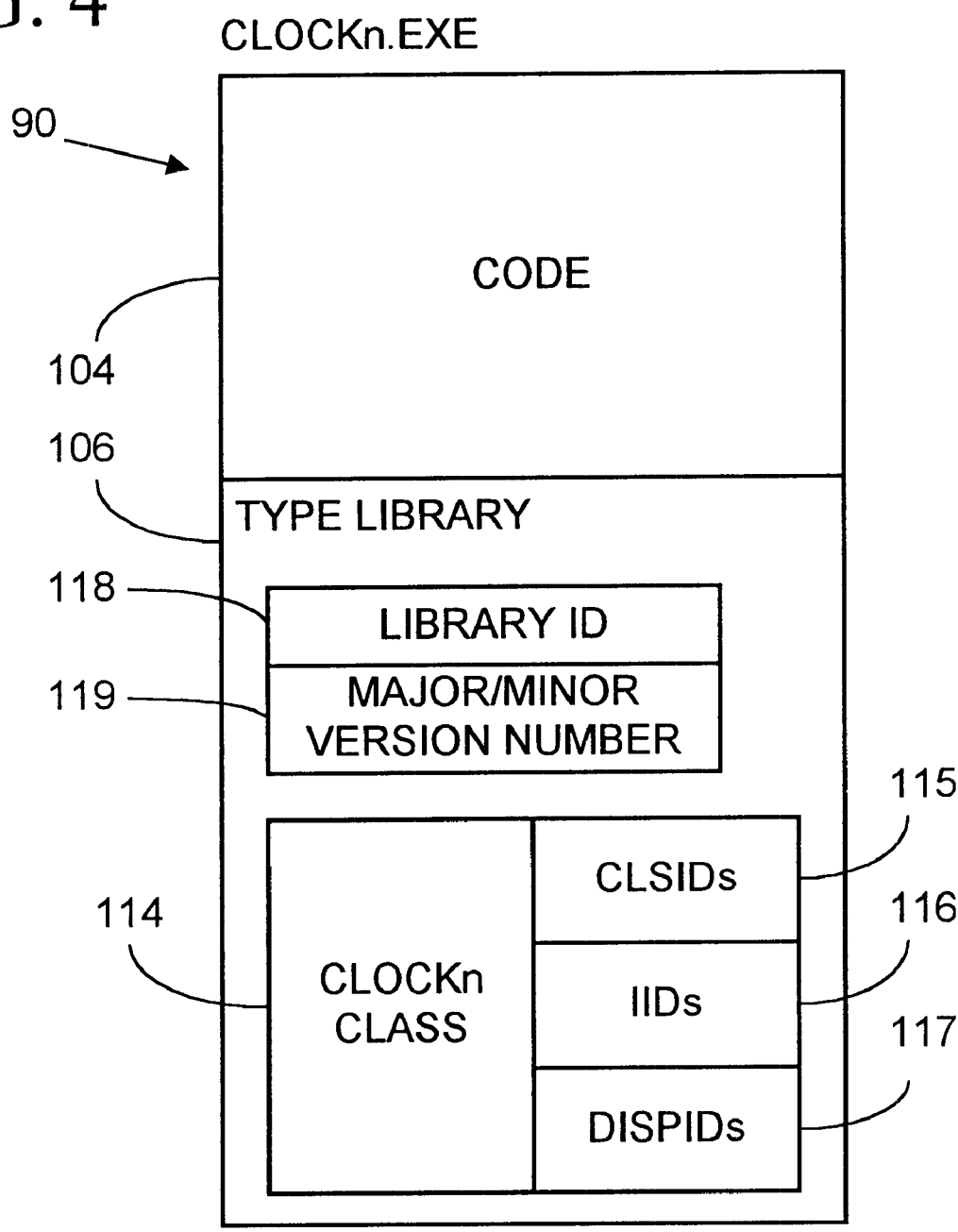
FIG. 4 is a block diagram of an executable file for the object server of FIG. 3.

FIGS. 3A, 3B, and 4 show an executable file 90 (FIG. 4) generated by compiler 52 for an existing version 92 (FIG. 3A) and a revised version 92' (FIG. 3B) of an exemplary object server which provides an object 94 named "Clock." In the existing version object server 92, clock object 94 has three members 96–98 (FIG. 3A), respectively named "SetTime," "GetHour," and "GetMinute," as well as properties 100 which include integer values named "hour," and "minute." In the revised version object server 92', clock object 94' is changed by adding a new member 99, named "SetAlarm," along with new integer values, "alarmHour," and "alarmMinute" to properties 100'. A client application 101 (FIG. 3) manipulates or controls clock object 94 or 94' by calling members 96–99. Specifically, SetTime member 96 includes code that sets the "hour" and "minute" properties 100 based on two integers it receives as arguments when called. GetHour member 97 returns the value of the "hour" property to its caller, while GetMinute function 98 returns the value of the "minute" property. SetAlarm 99 includes code that set the "alarmHour," and "alarmMinute" properties 100 based on two integers it receives as arguments when called.

Referring more particularly to FIG. 3A, to expose the functionality provided in clock object 94 to client application 101, object server 92 supports an interface ("ITime$_1$") 110 on clock object 94 by which client application 101 can access members 96–97. ITime$_1$ interface 110 conforms to OLE 2 conventions, and is implemented as a virtual function table or array of function pointers in code portion 104 of object server's executable file 90. In this vtable, ITime$_1$ interface 110 includes pointers to members 96–98 of clock object 94. The members 96–98 can then be accessed by code in client application 101 based on their particular offset within the vtable.

In conformance with OLE 2, the vtable for ITime$_1$ interface 110 also includes pointers to a standard set of interface functions 124–126, "QueryInterface," "AddRef," and "Release." QueryInterface function 124 includes code for obtaining a pointer to other interfaces on clock object 94. Client application 101 can call QueryInterface function 124 passing an interface ID (IID) of another interface on the Clock object 92 and will be returned by QueryInterface a pointer to that interface. AddRef and Release functions 125–126 include code for OLE 2 to track the number of references from client applications currently using an instance of clock object so that memory allocated to such instance can be released when the instance is no longer in use. Functions 124–126 also are accessed by client application 101 according to their offset within the vtable.

The vtable for ITime$_1$ interface 110 also includes pointers to functions "GetIdsOfName" 127, "Invoke" 128, and "GetTypeInfo" 129 which implement a dispatching interface conforming to the description in Corbett, et al., Method and System for Invoking Methods of an Object through a Dispatching Interface, U.S. Pat. No. 5,515,536 incorporated hereinabove by reference. GetIdsOfName function 127 includes code for obtaining a DISPID 117 of a particular member 96–97 given its name. Invoke function 114 includes code which calls a particular member 96–97 of clock object 94 given its DISPID 117. GetTypeInfo function 129 returns a datum relating to the type of a specified member 96–97.

Referring now to FIG. 3B, in the revised object server version 92', the clock object 94' includes an additional member function "SetAlarm" 99. To additionally expose the functionality of this added member 99 to client application 101, version compatible compiler 52 (FIG. 2) generates the revised object server version 92' with a new interface ITime$_2$ 111 implemented as a vtable including a pointer to the SetAlarm member 99.

Referring to FIG. 4, object server's executable file 90 is generated by compiler 52 from a Visual Basic language description of clock object 94 in the source data 60 entered by the user. To form the members 96–99 of clock object 94, 94', for example, the user can enter the following statements. Sub SetTime (hr As Integer, min As Integer)
   hour=hr
   minute=min
   visualclock_redrawBigHand(hour)
   visualclock$_{13}$redrawLittleHand(minute)
End Sub
Function GetHour ( ) As Integer
   GetHour=hour
End Function
Function GetMinute ( ) As Integer
   GetMinute=minute
End Function
Sub SetAlarm (hr As Integer, min As Integer)
   alarmHour=hr
   alarmMinute=min
End Sub A portion of executable file 90 stores code 104 that compiler 52 generates to implement members 96–99. Another portion of executable file 90 is a type library 106 which stores type information generated by compiler 52. In particular, type library 106 stores information defining interfaces 110–111 (FIG. 3) on objects (e.g. clock object 94, 94') in object server 92 and those objects' classes, including names and identifiers associated with the objects' interfaces 110–112 and classes. In the type library 106 for the exemplary object 92 for example, type library 106 stores a class name 114 (e.g. "clockN"), a class identifier ("CLSID") 115, interface identifiers ("IIDs") 116, and dispatch identifiers (DISPIDs) 117 for the class and interfaces 110, 111 of clock object 94. Type library 106 further stores a library ID 118 and a version number 119 associated therewith. Preferably, type library 106 conforms to the description in U.S. patent application Ser. No. 07/959,056, now U.S. Pat. No. 6,209, 404, entitled "Method and System for Interfacing to a Type Library," incorporated hereinabove by reference.

Referring again to FIG. 3A, client application 101 interacts with and controls clock object 94 in a manner conventional to OLE 2. When client application 101 and object server 92 are running on computer system 20, client application 101 calls an application programming interface of OLE 2 to create an instance of clock object 94 based on CLSID 115 assigned to clock object's class, and to obtain a pointer 130 to a pointer 131 of ITime$_1$ interface 110 based on ITime$_1$ interface's IID 116. In creating clock object 94, object server 92 dynamically allocates storage in memory 38 for clock object's properties 100. Using QueryInterface function 124, client application 101 an obtain pointer 130 to ITime$_1$ interface 110 or any other interface on clock object 94 based on the interfaces' respective IIDs 116. Each function in the vtable of ITime$_1$ interfaces 110 can be accessed by client application 101 at the function's respective offset within the interface. Client application can call GetHour function 97, for example, based on the offset of that member's pointer within IVTable 110. Client application 101 can further call members 97–99 by calling invoke function 106 in IDispatch 106 based on the member's respective DISPIDs 117. Source code of client application might include, for example, the following statements in the C programming language for obtaining pointer 130 to the pointer 131 of ITime$_1$ interface 110 on clock object 94 and calling SetTime member 97:
include Clock.h (a header file including #define statements that define constants CLSID_Clock, IID_ITime, and DISPID_settime corresponding to clock object's identifiers)

. . .

hresult=CoCreateInstance(CLSID_Clock, Null, CLSCTX_SERVER, IID_ITime, &pClock);

(creates instance of clock object 94)
hresult=pClock->QueryInterface(IID_ITime, &pTime);

(obtains pointer 130 to pointer 131 of ITime$_1$ interface 110)
pTime->SetTime(10,30);

(calls SetTime function 97 at its offset in IVTable 105)
pTime->Invoke(DISPID_settime, {10,30});

(calls SetTime function 97 based on its DISPID by calling invoke function 128 through IDispatch 106)

Once the statements in the source data of client application 101 are compiled into executable code, the identifiers and vtable offsets which this code relies upon to access members 96–99 of clock object 94 through interfaces 110–112 are built into client application 101. The compiled client application 101 therefore can only access versions of object server 92 which support these identifiers 115–117 and vtable offsets. For the revised object server version 92' (FIG. 3B) to be operable with client application 101 which is built against existing object server version 92 (FIG. 3A), the revised object server version 92' must be built to also support the ITime$_1$ interface 110 of the existing object server version 92. In other words, revised object server version 92' must be version compatible with existing object server version 92.

FIG. 5 shows a process 78 which is utilized by compiler 52 in building object server executable files (e.g. executable file 90). Process 78 is utilized both in generating an initial version of an object server (i.e. when automatic version compatible object server building is not selected), and again when building new object server 64 (FIG. 2) to be compatible with existing object server 66 (FIG. 2) (i.e. when version compatible object server building is selected by entry of existing object server's name in the compatible object application field). As described above, process 78 in the preferred embodiment forms a portion of the overall compiling process described in U.S. patent application Ser. No. 08/328,171, entitled "Module Dependency Based Incremental Compiler and Method," in which interfaces on objects supported in the object server are generated. In the overall compiling process described therein, the assignment of identifiers takes place in transition to a declared compilation state of object server 92. Process 78 also can be incorporated in other known overall compiling processes.

Within process 78, compiler 52 assigns vtable offsets, DISPIDs, IIDs, CLSIDs, a library ID, and library version numbers for the members, interfaces, classes, and type library of the object server being compiled. To assign the CLSIDS, IIDs, DISPIDs, and vtable offsets for each class in the object server, process 78 preferably includes an outer loop (steps 140–147) which is repeated for each class of the object server, and an inner loop (steps 141–144) which is repeated for each member of the class (the "current class") in the current iteration of the outer loop.

At step 141 in the inner loop, compiler 52 assigns the vtable offset to the member in the current iteration of the inner loop (the "current member"). As described previously, the vtable offset of the member is the position of a pointer to the member in a vtable which implements an interface for the member's class. In the case of object server 92 (FIG. 3A) for example, the vtable offsets of the pointers to the SetTime, GetHour, and GetMinute members in the vtable of interface 110 are assigned at step 141 in successive iterations of the inner loop.

In a next step 141 of process 78, a DISPID is assigned by compiler 52 to the current member. DISPIDs in the preferred embodiment are 32-bit values which are associated one-to-one with the members in a class. DISPIDs, however, are not unique between the members of two different classes. In the case of object server 92 for example, compiler 52 generates a different DISPID for each of members 96–99 of clock object's class. Compiler 52 may assign the same DISPID to GetHour member 97 and to a member of another class, but not to another member 96, 98 of clock object's class.

The inner loop 141–144 of process 78 is repeated until the vtable offsets and DISPIDs of all members of the current class have been assigned. After completing the inner loop for all members of the current class, process 78 continues to step 145.

In a next step 145, compiler 52 assigns a CLSID to the current class. CLSIDs uniquely identify classes in OLE 2, and are used by OLE 2 to create new instances of the class based on information in the system registry. Each CLSID preferably is a 128-bit globally unique identifier (GUID) value. GUIDs can be generated by calling an OLE 2 API function which randomly generates the value based on a serial number of a network adapter card installed as a peripheral input/output device 24, 26 of computer system 20, and the time of the API function call. In the case of object server 92 for example, a CLSID is uniquely associated with the class that defines clock object 94. Since the CLSID uniquely identifies the class, an instance (e.g. clock object 94) of the class can be created by OLE 2 based on its CLSID.

In a next step 146, compiler 52 assigns an IID to each interface of the current class. In OLE 2, each IID uniquely identifies a specific interface (i.e. set of function signatures with associated vtable offsets and/or DISPIDs). IIDs are used by client applications in OLE 2 to access a particular interface on an object, such as when creating an object or in a call to the QueryInterface function. As objects created from a CLSID may support more than one programmatic interface, there is a many-to-one relationship between IIDs and CLSIDs. Each IID also is a 128-bit GUID value. In the case of object server 92 (FIG. 3A) and 92' (FIG. 3B) for example, IIDs are associated with the interfaces 110–111 reflecting these interfaces' support of particular vtable offsets and DISPIDs of members 96–99.

The outer loop 140–147 of process 78 is repeated until the CLSID of all classes in the object server, as well as the IIDs of their interfaces and vtable offsets and DISPIDs of their members, have been assigned. After completing the outer loop for all classes in the object server, process 78 continues to step 148.

In step 148, compiler 52 generates the type library for the object server's executable file. As described above, compiler 52 generates the type library to conform with the description in U.S. patent application Ser. No. 07/959,056, entitled "Method and System for Interfacing to a Type Library." Now U.S. Pat. No. 6,209,404, The type library stores type information for the version of the object server being compiled, including the CLSIDs, IIDs, and DISPIDs of the classes, interfaces, and members of that object server. More specifically, compiler 52 stores the information generated in steps 140–143 in the type library. In the case of object server 92 for example, compiler 52 generates type library 106 in the object server's executable file 90, and stores therein type information of the clock object's class including lists of its associated CLSIDs 115, IIDs 116, and DISPIDs 117 supported by the object server.

Further, in steps 145–146, compiler 52 assigns the library ID and version number to the type library generated in step 144. The library ID and version number also are stored in the type library. In OLE 2, each library ID is a 128-bit GUID that uniquely identifies the type library of an object server. Each library ID has a one-to-many relationship to the CLSIDs and IIDs provided in its respective object server. The same library ID is assigned to each version of the object server. The type library version number consists of a major version number and minor version number used in OLE 2 to track successive versions of the object server. The major and minor version numbers are each 16-bit values. In the case of object server 92 for example, compiler 52 generates library id 118 and version number 119 in type library 106.

When automatic version compatible object server building is not selected (such as when compiling an initial version of an object server), compiler 52 generates a new vtable offsets and identifiers in steps 140–150. The resulting object server 92 therefore is extremely unlikely to support the same interfaces as any other object server. (The bit-length of the library ID, CLSIDs, and IIDs, and OLE 2's random generation routine used in the preferred embodiment to generate these identifiers, guarantees to a very high probability that no two identifiers generated by compiler 52 are identical.) When automatic version compatible object server building is selected, however, compiler 52 first performs process 76 (FIG. 6) to determine whether new object server 64 (FIG. 2) can be made version compatible with existing object server 66 (FIG. 2). Then, in process 78 (FIG. 5), compiler assigns vtable offsets and identifiers of new object server according to the new object server's compatibility as described more fully below.

Figure 6:
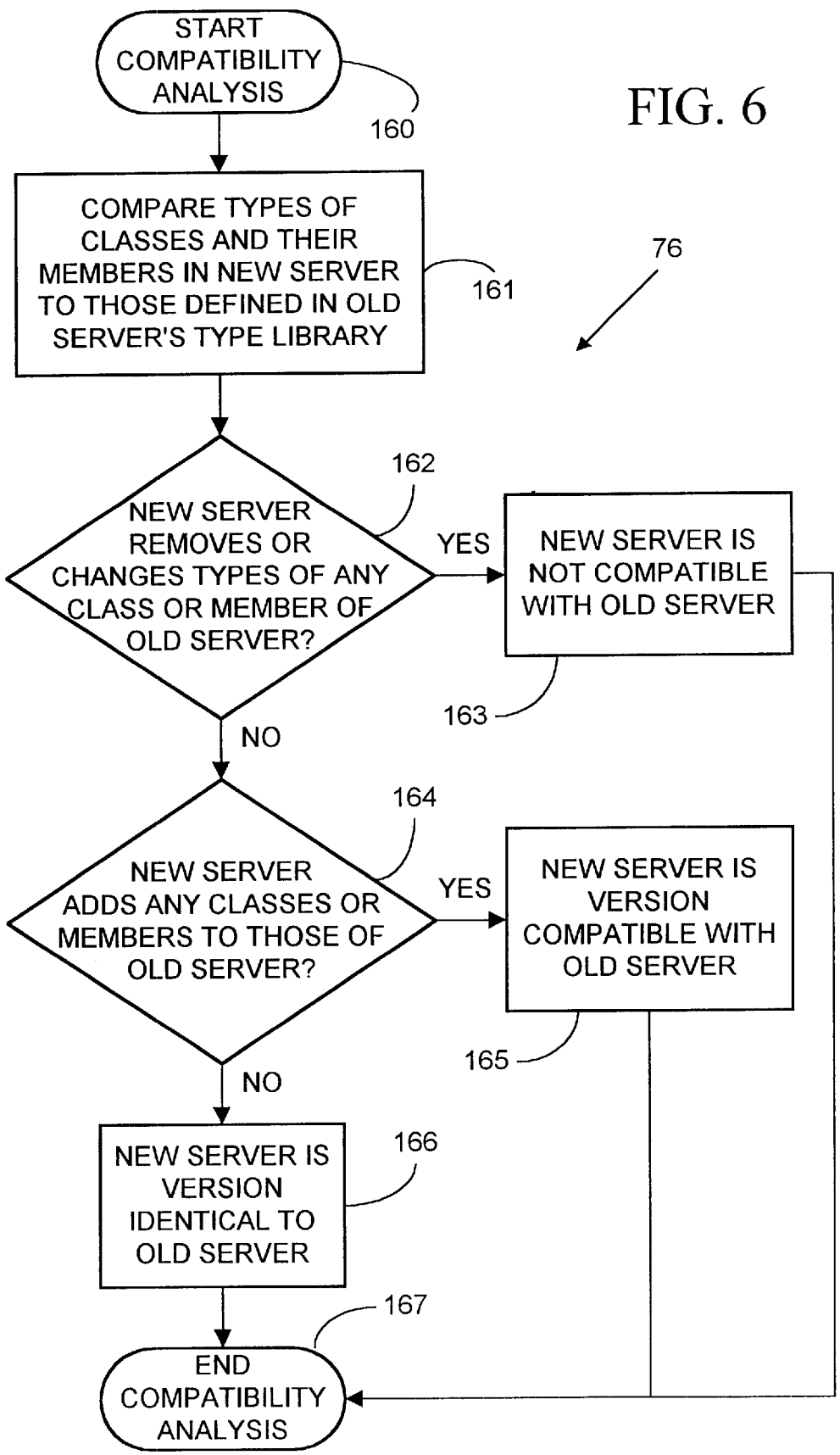
FIG. 6 is a flow diagram of a process utilized in the compiler of FIG. 2 to build version compatible object servers.

FIG. 6 shows version compatibility analysis process 76 (FIG. 6) comprising steps 160–167 which is utilized by compiler 52 (FIG. 2) in version compatibility analyzer 70 (FIG. 2) to determine whether new object server 64 (FIG. 2) can be version compatible with existing object server 66 (FIG. 2). In general, edits in source data 60 (FIG. 2) which change any interface supported by existing object server 66 prevent new object server 64 from being version compatible with existing object server 66. For example, any of the following edits to a class of existing object server 66 in source data 60 prevent new object server 64 from being version compatible: changing the name of a class, changing the name of a member of the class, changing the number or types of parameters of a member, changing the type of return value of a function member, changing the type (procedure or function) of a member, or removing a member. On the other hand, edits which do not change any interface supported by existing object server 66 can be made to source data 60 without making new object server 64 incompatible. For example, the following edits do not prevent new object server 64 from being version compatible with existing object server 66: changing code within a member, changing the position of a member in a class, and adding a new member to a class.

In the preferred embodiment, version compatibility analyzer 70 performs process 76 when new object server 64 is being built. In alternative embodiments of the invention, version compatibility analyzer 70 can check for version compatibility as each edit is made to source data 60. Version compatibility analysis during editing has the advantage of providing immediate notification to the user that an edit may cause incompatibility with existing object server 66 at the time of the edit. However, to accurately detect all edits that actually cause incompatibility, version compatibility analysis during editing can add undue complexity to the source editor in many language systems. Although version compatibility analysis to detect incompatibility is not performed until new object server 64 is built in the preferred embodiment, source editor 56 preferably checks for edits that are likely to cause incompatibility and provides warning to the user of the likely incompatibility.

In process 76, version compatibility analyzer 70 determines version compatibility with existing object server 66 by comparing source data 60 to type information stored in existing object server's type library 150. As described above, type information defining each object server's interfaces is generated for the object server during compiling into an executable file and retained in its type library. In the preferred embodiment, therefore, compiler 52 requires the existing object server's executable file 66 to automatically build edited source data 60 into new version compatible object server 64.

At step 161 in version compatibility analysis process 76, version compatibility analyzer 70 compares the types of the classes and their members in new object server 64 to those defined in the type information of the existing object server's type library 150. In the preferred embodiment, version compatibility analyzer 70 performs this comparison by comparing the type information of each class in new object server 64 to the type information of a identically named class in existing object server's type library 150. If existing object server 66 does not include a identically named class for any of new object server's classes, new object server is considered to have added such classes over existing object server 66. On the other hand, if there are any classes of existing object server 66 left unprocessed after processing each class of new object server 64 (i.e. for which there is no identically named class in new object server), new object server 64 is considered to have removed the classes over existing object server 66. When comparing identically named classes from each of new and existing object servers 64, 66, version compatibility analyzer 70 compares each public member of the new object server's class to a identically named public member of the identically named existing object server's class. Again, any public member of the new object server's class for which there is no identically named public member in existing object members class is considered to be added by new object server 64. Any public member of the existing object server's class for which there is no identically named public member in the identically named new object server's class is considered as removed in new object server 64.

As each identically named class and public member of the new and existing object servers 64, 66 is compared, version compatibility analyzer 70 further compares the types of the classes and public members (including the members' parameters and return values). If the types of any of these identically named classes or public members do not match, new object server 64 is considered to have changed the class or public member over existing object server 66.

As indicated at steps 162 and 163 of version compatibility analysis process 76, when new object server 64 is determined to have removed or changed types of any class or public member over existing object server 66 from the comparison in step 161, new object server 64 is determined by version compatibility analyzer 70 to be incompatible with existing object server 66. In such a case, new object server 64 can not be compiled to support every class and interface of existing object server 66. In the preferred embodiment, user interface 59 notifies the user that new object server 64 cannot be compatible, such as by displaying a dialog box with such a message. User interface 59 preferably further queries the user whether to proceed with compiling new object server 64 despite incompatibility with existing object server 66, or return to editing source data 60 so as to undo the edits which caused incompatibility.

As indicated at steps 164 and 165, when new object server 64 is determined from the step 161 comparison to have added any class or any public member to a class over existing object server 66, new object server 64 is determined by version compatibility analyzer 70 to be version compatible with existing object server 66. In this situation, new object server 64 can be built to support each interface of existing object server 66, but must also support at least one additional interface due to the added class or public member.

As indicated at steps 162, 164 and 166, when no class or public member is added, changed, or removed by new object server 64 over those of existing object server 66, version compatibility analyzer 70 concludes that new object server 64 is version identical to existing object server 66. That is, new object server 64 can be built to support each interface of existing object server 66 without adding any interfaces.

The following table 1 contains an exemplary pseudo-code listing implementing version compatibility analysis method 76.

TABLE 1

Exemplary Pseudo-code Listing of Version compatibility analysis Process.

```
For each public class c in source data 60
    if there is a public class c_old in existing object
    server type library 150 by the same name as c then
        if UserTypesAreCompatible(c, c_old) then
            mark c_old as processed;
            add c_old's list of CLSIDs to set of CLSIDS
            supported by c;
            add c_old's list of IIDs to set of IIDs
            supported by c
        else
            generate an incompatibility error
        exit
```

TABLE 1-continued

Exemplary Pseudo-code Listing of Version
compatibility analysis Process.

```
    else
        note that new version supports additional classes
    endif
Next c
if there are any public classes in existing object
server type library 150 that have not been processed
then
    exit and generate an incompatibility error since
    there are classes in existing object server 66 which
    are not supported in new object server 64
UserTypesAreCompatible(c, c_old)
for each public member of class c
    if there is a public member of c_old by the same
    name and same property type (get, let, or set-ness)
    then
        if the number of parameters are equal then
            for I=1 to count of parameters
                if not parameters' names match and
                TypesAreSame(c.member.params (i),
                c_old.member.params(i)) then
                    exit and generate an incompatibility error
            next I
            assign same DISPID, vtable offset to c's member
            as c_old's member
        else if the count of parameters is not equal
            exit and generate an incompatibility error
            (Note: it is OK if the number of optional
            parameters changes except that fewer optional
            parameters means source incompatible but still
            binary compatible)
        endif
    else
        new IID must be allocated
    endif
if there are any members of c_old that have not been
checked then
    exit and generate an incompatibility error since
    c_old has members not in c
TypesAreSame(type1, type2)
if type1 is an intrinsic type then
    return (type 2 is a matching intrinsic)
else if type 1 is an array then
    return (type2 is an array) AND TypesAreSame(element
    type of type1, element type of type2)
else if type1 is a record Type
if type1 is a user-defined type (e.g. described by a
TypeInfo) then
    if type2 is not a user-defined type then
        return FALSE
    if type1 is not defined in source data 60 then
    return (iid of type1) == (iid of type2)
    else
        if we are already in the process of verifying that
        type1 and type2 match (because of a cycle in the
        class reference graph) then
            assume that they will match and return TRUE
        else
            return UserTypesAreSame(Type1, Type2)
```

Referring again to FIG. 5, compatible object server generator 72 (FIG. 2) performs steps 140–150 of process 78 according to the compatibility of new object server 64 with existing object server 66 as determined by version compatibility analyzer 70 utilizing process 78. More specifically, in steps 142 and 143, compatible object server generator 72 assigns vtable offsets and DISPIDs for members of classes of new object server 64 based on its compatibility with existing object server 66. If new object server 64 was determined at step 163 (FIG. 6) to be incompatible, compatible object server generator 72 generates an interface in which new vtable offsets and new DISPIDs are assigned to members of classes of new object server 64. If new object server 64 was determined to be version compatible at step 165 (FIG. 6), compatible object server generator 72 generates an interface with identical vtable offsets and DISPIDs as are supported by existing object server 66 and defined in its type library 150, and additionally generates new vtable offsets and DISPIDs for each of the new members added to the classes of new object server 64. Otherwise, if new object server 64 is determined to be version identical at step 166 (FIG. 6), compatible object server generator generates only identical vtable offsets and DISPIDs as supported by existing object server 66 and defined in its type library 150.

The assignment of new object server's registration properties (i.e. its CLSIDs, IIDs, library ID, and version number in steps 142–143 and 145–146) also are based on the new object server's compatibility status determined in process 76 (FIG. 6) as shown in the following table 2.

TABLE 2

Setting of Object Server Registration Properties.

| | New Project | Version Identical | Version Compatible | Not Version Compatible |
|---|---|---|---|---|
| Library ID | New Library ID generated | No change | No change | New Library ID generated |
| Library Version Number | 1.0 | No change | Increment Minor version number | 1.0 |
| CLSIDs | New CLSID generated | No change | New CLSID generated for each new class and each class with new members | New CLSID generated |
| IIDs | New IID generated | No change | New IID generated for each new class and each class with new members | New IID generated |

As indicated at step 148, compatible object server generator 72 generates a type library 170 for new object server 64 and stores its type information therein. Referring again to FIGS. 3A and 3B, when revised object server version 92' (FIG. 3B) is compiled to be compatible with existing object server version 92 (FIG. 3A) for example, version compatibility analyzer 70 applies process 76 and determines that version 92' can be version compatible with version 92. Versions 92' is version compatible with version 92 because the names and types of members 96–98 are carried over from the existing version 92, but SetAlarm member 99 is added to clock object 94' in revised version 92'. Since the versions 92, 92' are compatible, compatible object server generator 72 assigns the same DISPIDs and vtable offsets to the members 96–98 as in existing version 92, and a new DISPID and vtable offset to the new SetAlarm member 99. As shown in the above table 2, compatible object server generator 72 further assigns a list of CLSIDs to the clock object class which includes those assigned to the clock object class in the existing object server as well as a new CLSID. Likewise, the clock object class' interface 111 is assigned a list of IIDs which includes the IIDs assigned to the interface 110 of existing object server version 92 as well as a new IID. The library ID assigned to the type library of the revised object server version 92' is the same as that assigned to the type library of existing object server 92, but the minor version number of the revised object server's type library is incremented over that of the existing object server. These identifiers and vtable offsets are stored in the type library generated for the revised object server version 92 as illustrated in FIG. 4 and described above.

By assigning the vtable offsets, DISPIDs, IIDs, CLSIDs, library ID, and version numbers as just described, the client application 101 which is built against the existing object server version 92 remains operable with the revised object server version 92'. Since clock object 94' in the revised version 92' is assigned a list of CLSIDs including the CLSID previously assigned to clock object 94 in the existing version 92, the code in client application 101 which creates an instance of the clock object (i.e. the CoCreateInstance call described above) still operates with the revised object server version 92'. Further, since interface 111 in the revised version 92' is assigned a list of IIDs including the IID previously assigned to interface 110 in the existing version 92, the code in client application 101 which obtains pointer 130 to an interface on the clock object (i.e. the QueryInterface call described above) still operates with the revised object server version 92'. Finally, since the members 96–98 are assigned identical vtable offsets and DISPIDs in the revised version 92', the code in client application 101 which accesses these members also remains operable with the revised object server version 92'. Thus, when compiled by compiler 52 to be compatible with existing version 92, revised version 92' continues to support the vtable offsets, DISPIDS, IIDs, and CLSIDs of the existing version 92. In a like manner, any object server version compiled to be compatible with revised version 92' must further support the new CLSID assigned to object server 94', the new IID assigned to interface 111, and the new vtable offset and DISPID assigned to SetAlarm member 99.

Having described and illustrated the principles of our invention with reference to a preferred embodiment, it will be recognized that the preferred embodiment can be modified in arrangement and detail without departing from such principles. For example, elements of the preferred embodiment shown in software may be implemented in hardware and vice versa. In view of the many possible embodiments to which the principles of our invention may be applied, it should be recognized that the detailed embodiments are illustrative only and should not be taken as limiting the scope of our invention. Rather, we claim as our invention all such embodiments as may come within the scope and spirit of the following claims and equivalents thereto.

We claim:

1. A method in a computer system of automatically compiling version compatible object servers, the method comprising the steps of:

compiling a first program into a first version object server having a set of one or more interfaces;

compiling a second program into a second version object server to be version compatible with the first version object server, said compiling into the second version object server comprising:

verifying whether the second program can compile into a second version object server that provides at least each interface of the first version object server; and if the verifying step shows that second program can be compiled into the second version object server that provides at least each interface of the first version object server, generating a set of interfaces for the second version object server so as to comprise interfaces that match each interface of the first version object server.

2. The method of claim 1 wherein the step of compiling the second program further comprises the additional step of:

generating a user notification of a compilation error if the verifying step shows that second program cannot compile into a second version object server that provides each interface of the first version object server.

3. The method of claim 1 comprising the additional steps of:

compiling the first program into the first version object server having a first type library containing type information of the first version object server;

assigning a first type library version number having a major version number and a minor version number to the first type library; and the step of compiling the second program further comprising, if the verifying step shows that the second program can compile into the second version object server that provides each interface of the first version object server, then generating a second type library containing type information for the second version of the object server; and assigning a second type library version number to the second type library, the second type library version number having a minor version number incremented with respect to the minor version number of the first type library version number.

4. A method in a computer system of automatically compiling version compatible object servers, the method comprising the steps of:

compiling a first program into a first version object server having a set of one or more interfaces, and a first type library containing type information of the first version of the object server;

assigning a first unique type library identifier to the first type library;

compiling a second program into a second version object server to be version compatible with the first version object server, said compiling into the second version object server comprising:

compatibility checking the second program against the type information in the first type library to detect whether any version incompatible differences exist between the first and second version object servers; and if no version incompatible difference is detected, generating a set of interfaces for the second version object server so as to comprise interfaces that match each interface of the first version object server, generating a second type library containing type information for the second version of the object server, and assigning the first unique type library identifier to the second type library.

5. The method of claim 4 the additional steps of:

the step of compiling the second program further comprising, if a version incompatible difference between the first and second versions of the object server is detected in the compatibility checking step, then generating a second type library containing type information for the second version of the object server; and assigning a second unique type library identifier to the second type library.

6. A method in a computer system of automatically compiling version compatible object servers, the method comprising the steps of:

compiling a first program into a first version object server having a set of one or more interfaces, and a first type library containing type information of the first version of the object server;

in compiling the first version of the object server, assigning unique interface identifiers in a one-to-one relationship to each interface of the first version of the object server; and compiling a second program into a second version object server to be version compatible with the first version object server, said compiling into the second version object server comprising:

compatibility checking the second program against the type information in the first type library to detect whether any version incompatible differences exist between the first and second version object servers; and if no version incompatible difference is detected, generating a set of interfaces for the second version object server so as to comprise interfaces that match each interface of the first version object server, and assigning the same interface identifier to any interface of the second version of the object server which also is included in the set of interfaces for the first version of the object server as the interface identifier assigned to said any interface in compiling the first version of the object server.

7. The method of claim 6 wherein the first and second versions of the object server each define one or more object classes, and wherein the object classes defined by the first and second versions of the object server have one or more members each, the step of compiling the second program further comprising the additional step of:

if no version incompatible difference between the first and second versions of the object server is detected in the compatibility checking step, additionally assigning a new unique interface identifier to each interface of an object class in the second version of the object server having new members.

8. The method of claim 6 wherein the step of compiling the second program further comprises the additional step of:

if a version incompatible difference between the first and second versions of the object server is detected in the compatibility checking step, assigning unique interface identifiers which differ from those assigned to the interfaces of the first version of the object server to each interface in the set of interfaces for the second version of the object server.

9. A method in a computer system of automatically compiling version compatible object servers wherein the first and second versions of the object server each define one or more object classes, the method comprising the steps of:

compiling a first program into a first version object server having a set of one or more interfaces, and a first type library containing type information of the first version of the object server;

in compiling the first version of the object server, assigning unique class identifiers in a one-to-one relationship to the object classes defined by the first version of the object server; and compiling a second program into a second version object server to be version compatible with the first version object server, said compiling into the second version object server comprising:

compatibility checking the second program against the type information in the first type library to detect whether any version incompatible differences exist between the first and second version object servers; and if no version incompatible difference is detected, generating a set of interfaces for the second version object server so as to comprise interfaces that match each interface of the first version object server, and assigning the same class identifier to any object class defined by the second version of the object server which also is defined by the first version of the object server as the class identifier assigned to such object class in compiling the first version of the object server.

10. The method of claim 9 wherein the step of compiling the second program further comprises the additional step of:

if a version incompatible difference between the first and second versions of the object server is detected in the compatibility checking step, assigning unique class identifiers which differ from those assigned to the object classes defined by the first version of the object server to each object class defined by the second version of the object server.

11. The method of claim 9 wherein the object classes defined by the first and second versions of the object server have one or more members each, the wherein the step of compiling the second program further comprising the additional step of:

if no version incompatible difference between the first and second versions of the object server is detected in the compatibility checking step, additionally assigning a new unique class identifier to each object class in the second version of the object server having new members.

12. The method of claim 9 wherein the object classes defined by the first and second versions of the object server have one or more members each, the method comprising the additional steps of:

in compiling the first version of the object server, assigning dispatch identifiers in a one-to-one relationship to the members of each object class defined by the first version of the object server; and the step of compiling the second program further comprising, if no version incompatible difference between the first and second versions of the object server is detected in the compatibility checking step, assigning the same dispatch identifier to any member included in an object class defined by the second version of the object server which also is included in a definition of that object class by the first version of the object server as the dispatch identifier assigned to such member in compiling the first version of the object server.

13. A method in a computer system of automatically generating compatible versions of an executable program, the method comprising:

generating a first set of one or more interfaces for accessing class members defined in a first version of an executable program;

associating identifiers with the interfaces of the first version of the executable program;

detecting any version incompatible differences between the first version of the executable program and source code for a second version of the executable program;

if no version incompatible difference is detected, generating a second set of one or more interfaces for accessing any class members defined in the second version of the executable program, the second set comprising interfaces that match each interface in the first set; and associating the same identifiers with the interfaces of the second version of the executable program.

14. The method of claim 13 wherein the step of detecting any version incompatible differences between the first and second versions of the executable program further comprises:

verifying that each class in the first version of the executable program also is defined in the source code of the second version of the executable program and that the types of such classes match between the first version of the executable program and the source code of the second version of the executable program.

15. The method of claim 14 further comprising:

verifying that each public member in each class in the first version of the executable program also is defined in the source code of the second version of the executable program and that the types of such public members match between the first version of the executable program and the source code of the second version of the executable program.

16. The method of claim 15 further comprising:

verifying that the parameter types and return types of each public member defined in the first version of the executable program and the source code of the second version of the executable program match.

17. A compiler for automatically generating compatible versions of an executable program, comprising:

a version compatibility analyzer for comparing types of class members in source code for a second version of the executable program against those in a first version of the executable program to verify whether the source code can be compiled into the second version of the executable program that provides at least each interface in the first version of the executable program; and a compatible executable program generator in communication with the version compatibility analyzer for, in response to a positive verification, generating a set of at least one interface in the second version of the executable program so as to comprise interfaces that match each interface in the first version of the executable program.

18. The compiler of claim 17, wherein the first version of the executable program has a type library containing type information that indicates the types of class members in the first version of the executable program; and wherein the version compatibility analyzer is operative to compare types of class members in the source code of the second version of the executable program against the type information contained in the type library of the first version of the executable program.

19. The compiler of claim 17, wherein the compatible executable program generator is further operable to associate version numbers with each of the first and second versions of the executable program, wherein the version numbers associated with the first and second versions of the executable program reflect the verification by the version compatibility analyzer of whether the source code can be compiled into the second version of the executable program that provides at least each interface in the first version of the executable program.

20. The compiler of claim 19, wherein:

the compatible executable program generator associates at least one version number with each of the first and second versions of the executable program, such that, in the case of a positive verification by the version compatibility analyzer, the version number associated with the second version of the executable program being incremented with respect to the version number associated with the first version of the executable program.

21. The compiler of claim 20, wherein:

the version compatibility analyzer is further capable of identifying whether all interfaces provided by the second version of the executable program are identical to the interfaces in the first version of the executable program; and the compatible executable program generator associates version numbers with identical major and minor portions to the first and second versions of the executable program in the case of all interfaces provided by the second version of the executable program being identical to the interfaces in the first version of the executable program.

22. A compiler for automatically generating compatible versions of an executable program, comprising:

a version compatibility analyzer for comparing types of class members in source code for a second version of the executable program against those in a first version of the executable program to verify whether the source code can be compiled into the second version of the executable program that provides at least each interface in the first version of the executable program; and a compatible executable program generator in communication with the version compatibility analyzer for, in response to a positive verification, generating a set of at least one interface in the second version of the executable program so as to comprise interfaces that match each interface in the first version of the executable program;

wherein the compatible executable program generator associates a unique interface identifier with each different interface, whereby the interface identifiers associated with the interfaces of the first and second versions of the executable program differ from each other when any version incompatible difference is detected between the first and second versions of the executable program, and at least one interface identifier is associated with an interface in both the first and second versions of the executable program when no version incompatible difference is detected between the first and second versions of the executable program.

23. The method of claim 1 further comprising:

compiling the first program into the first version object server having a first type library containing type information of the first version object server, wherein the type information contained in the first type library indicates types of class members in the first program; and in the verifying step, compatibility checking types of class members in the second program against the type information in the first type library to verify whether the second program can compile into the second version object server that provides each interface of the first version object server.

24. A compiler for automatically generating compatible versions of an executable program, comprising:

a compiler option selectable by a user for causing the compiler to automatically compile modified source code into a second version executable program to be version compatible with a first version executable program;

a compatibility checker operative to verify whether the modified source code can be compiled so as to produce the second version executable program that provides each interface of the first version executable program;

a user perceptible notification operative in response to the compatibility checker producing a negative verification to provide notice to the user that the modified source code is incapable of being compiled into a compatible second version executable program; and an executable program code generator operative in response to the compatibility checker producing a positive verification to compile the second version executable program from the modified source code so as to have a set of interfaces that includes interfaces compatible with each interface of the first version executable program.

25. The compiler of claim 24 further comprising:

a type information store associated with the first version executable program for storing type information descriptive of types associated with the interfaces of the first version executable program; and a type comparator associated with the compatibility checker for analyzing the modified source code relative to the type information to verify whether the modified source code can be compiled so as to produce the second version executable program that provides each interface of the first version executable program.

* * * * *